(No Model.)
W. H. GILMAN.
COMBINED ADVERTISING DEVICE AND CIGAR CUTTER.
No. 392,552. Patented Nov. 6, 1888.
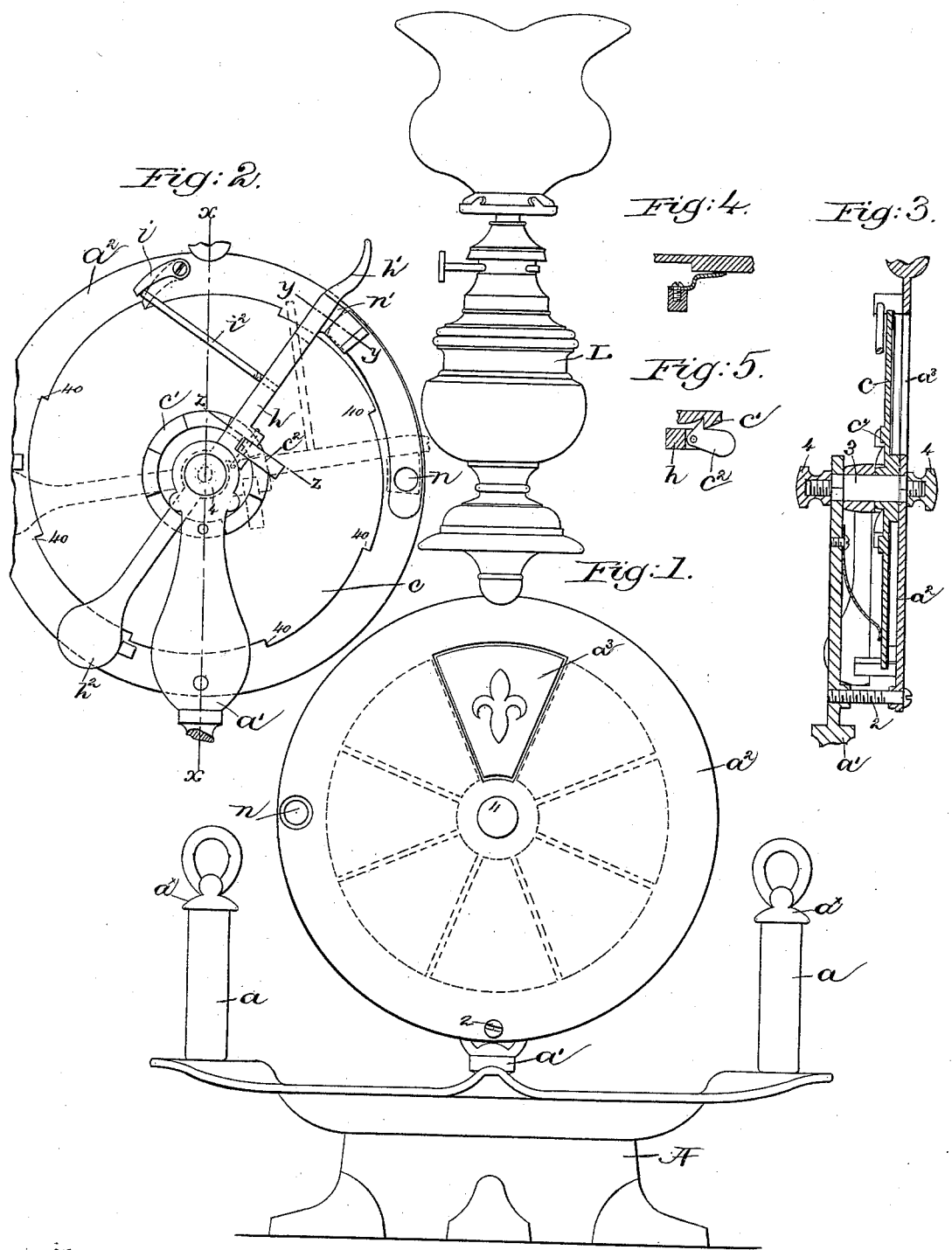
Witnesses.
Howard F. Eaton
John F. C. Prinkert
Inventor.
Willard H. Gilman
by Crosby Gregory
attys.

UNITED STATES PATENT OFFICE.

UNITED STATES PATENT OFFICE.

WILLARD H. GILMAN, OF BOSTON, MASSACHUSETTS, ASSIGNOR TO THE GILMAN ADVERTISING CO., OF CONCORD, NEW HAMPSHIRE.

COMBINED ADVERTISING DEVICE AND CIGAR-CUTTER.

SPECIFICATION forming part of Letters Patent No. 392,552, dated November 6, 1888.

Application filed April 21, 1888. Serial No. 271,439. (No model.)

*To all whom it may concern:*

Be it known that I, WILLARD H. GILMAN, of Boston, county of Suffolk, and State of Massachusetts, have invented an Improvement in a Combined Advertising Device and Cigar-Cutter, of which the following description, in connection with the accompanying drawings, is a specification, like letters on the drawings representing like parts.

This invention has for its object to construct a combined advertising device and a cigar-cutter adapted to be normally operated, as when cutting off the tips of cigars, to display in succession a series of advertisements.

The advertisements to be displayed are printed or mounted upon the face of the disk rotatable upon a suitable stud or bearing at the rear side of a face-plate having an opening through it of different size to display one advertisement or one section of the disk, containing, as it may, one or more advertisements. The disk is provided with ratchet-teeth, and a hand operating-lever is mounted upon the stud, which carries a push-pawl, which engages the ratchet-teeth of the disk, each movement of the hand operating-lever moving the disk one tooth. A suitable stop-motion is provided for the disk, so that it can be moved only the distance of one tooth at a time. The stop-motion is herein shown as a gravitating pawl, which engages one after another the teeth cut into the periphery of the disk, there being as many such teeth as there are to be steps in each rotation of the disk. The gravitating pawl is normally disengaged from, but it may be made to engage, the periphery of the disk, after it has been started, the disk continuing its rotation until stopped by the said pawl striking one of the peripheral teeth. The hand operating-lever is provided with a cutting-blade, which at some time during its movement passes over an opening cut through the face-plate, into which opening the tip of the cigar to be cut is entered.

The advertising and cutting apparatus is preferably mounted upon a suitable standard or base arranged, for instance, as a card-receiver and provided with suitable torches, and at its top the apparatus is provided with a suitable light for lighting the torches.

Figure 1 shows in front elevation a combined advertising device and disk-cutter embodying this invention; Fig. 2, a rear side view of the advertising device and cutter by itself; Fig. 3, a vertical section of the device shown in Fig. 2, taken on the dotted line $x\ x$; Fig. 4, a detail of the device shown in Fig. 2, taken on the dotted line $y\ y$; and Fig. 5, a detail of the device shown in Fig. 2, taken on the dotted line $z\ z$.

The base A of the apparatus is herein shown as shaped to receive cards and the like, said card-receiver having at each side the usual cylinders, $a$, for torches, attached by wire or otherwise in usual manner to the handles $a^x$. The center of the base-plate has rising from it a vertical post or standard, $a'$, which supports a face-plate, $a^2$, fixed to it by a screw, 2, and a stud, 3, provided with suitable nuts, 4. The stud 3 receives upon it loosely a disk, $c$, having at its rear side a series of ratchet-teeth, as $c'$, and a hand-lever, $h$, having at one end a hand or finger piece, $h'$, and at its opposite end a weight, $h^2$, which acts to normally keep the finger portion of the lever in elevated position. The hand-lever has pivoted to it a gravitating pawl, $c^2$, to engage the ratchet-teeth $c'$ of the disk $c$, said pawl being adapted to push the disk forward one tooth at each movement of the lever.

The disk $c$ is divided into sections, which either receive or have mounted thereon one or more advertisements, the several sections containing advertisements being displayed one at a time in succession through an opening, $a^3$, cut in the face-plate $a^2$, the number of sections corresponding with the number of ratchet-teeth $c'$.

As a stop-motion for the disk $c$, I provide a gravitating pawl, $i$, which is pivoted to the rear side of the face-plate $a^2$, and I provide the periphery of the disk $c$ with teeth, as 40, corresponding in number with the number of ratchet-teeth $c'$, the hand-lever $h$ being provided with an arm, $i^2$, which engages the pawl $i$, throwing it out of engagement with the peripheral teeth 40 of the disk $c$, when said lever is in its most elevated position, but permitting said pawl to engage the periphery of the disk $c$ as the lever descends and to strike one of the teeth thereof when the lever has reached its lowermost position, as indicated by the dotted line, Fig. 2. When the hand-lever is in this latter position, the pawl $c^2$ has moved the disk $c$ over a distance equal to one tooth of the series of ratchet-teeth $c'$, displaying a new section at the display-opening $a^3$. The face-plate $a^2$ is provided with an opening, $n$, into which the tip of the cigar may be inserted, the hand-lever at the rear side of the frame $a^2$ being provided with a cutting-blade, $n'$, which during the movement of the said hand-lever passes the opening $n$ and severs the tip of the cigar.

It will be seen that at each movement of the hand-lever the tip of a cigar may be severed and the disk $c$ be rotated a distance equal to one of the ratchet-teeth and a new section of the disk be presented at the display-opening $a^3$.

The top of the frame $a^2$, as shown, supports a lamp, I, which may be of any suitable construction.

I claim—

1. A combined advertising device and cigar-cutter consisting of a movable advertising disk or plate divided into sections, a face-plate having a display-opening for advertising-sections and a hole, $n$, a lever for moving the disk or plate step by step, and a cutting-blade attached to the lever, the cutting-blade during the movement of the lever passing the said hole $n$ and severing the tip from a cigar placed in the said hole, substantially as described.

2. The movable advertising disk or plate having two concentric series of ratchet-teeth upon its rear side and a face-plate having a display-opening, combined with the hand-lever and its pawl, which engages one of the series of ratchet-teeth of the disk or plate, and a stop-motion upon the face-plate for the advertising disk or plate, substantially as described.

3. A frame having a display-opening and a hole, $n$, a rotatable disk or plate, and a weighted hand-lever for rotating it step by step, the gravitating pawl $i$, which engages the teeth on the periphery of the disk or plate, and an arm, $i^2$, connected with the hand-lever, combined with a cutting-blade moved by the hand-lever, substantially as described.

4. The frame having a display-opening and opening $n$ for a cigar, the rotatable disk or plate, and a hand-lever for moving it step by step, a stop-motion for the disk or plate under the control of the hand-lever, combined with the cutting-blade $n'$, which during the movement of the hand-lever passes the said hole $n$, which receives the tip of a cigar to be cut, substantially as described.

5. A combined advertising device and cigar-cutter consisting of a movable advertising-plate to receive thereon advertisements, a face-plate having a display-opening through which the advertisements are visible, a lever for moving the advertising-plate, and a blade adapted to sever the tip from a cigar moved by the said lever, substantially as described.

In testimony whereof I have signed my name to this specification in the presence of two subscribing witnesses.

WILLARD H. GILMAN.

Witnesses:
 BERNICE J. NOYES,
 J. C. SEARS.